United States Patent
Miyazono et al.

(10) Patent No.: US 10,267,418 B2
(45) Date of Patent: Apr. 23, 2019

(54) VEHICLE CONTROL DEVICE AND VEHICLE CONTROL METHOD

(71) Applicants: JATCO Ltd, Fuji-shi, Shizuoka (JP); NISSAN MOTOR CO., LTD., Yokohama-shi, Kanagawa (JP)

(72) Inventors: Masayuki Miyazono, Isehara (JP); Hideshi Wakayama, Hadano (JP); Kyounggon Choi, Kanagawa (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/575,960

(22) PCT Filed: May 18, 2016

(86) PCT No.: PCT/JP2016/064763
§ 371 (c)(1),
(2) Date: Nov. 21, 2017

(87) PCT Pub. No.: WO2016/190195
PCT Pub. Date: Dec. 1, 2016

(65) Prior Publication Data
US 2018/0172149 A1    Jun. 21, 2018

(30) Foreign Application Priority Data

May 22, 2015    (JP) .................................. 2015-104176

(51) Int. Cl.
*F16H 59/18* (2006.01)
*F16H 61/662* (2006.01)
(Continued)

(52) U.S. Cl.
CPC ........... *F16H 61/662* (2013.01); *F16H 59/18* (2013.01); *F16H 59/42* (2013.01);
(Continued)

(58) Field of Classification Search
CPC .............. F16H 61/662; F16H 61/0204; F16H 61/66259; F16H 61/0213; F16H 59/18;
(Continued)

(56) References Cited

U.S. PATENT DOCUMENTS

| | | | |
|---|---|---|---|
| 4,823,646 A * | 4/1989 | Yoshimura | .......... F16H 61/0213 477/144 |
| 2013/0165295 A1* | 6/2013 | Kabe | ................... F16H 61/6648 477/37 |

(Continued)

FOREIGN PATENT DOCUMENTS

| | | |
|---|---|---|
| JP | 2010-078124 A | 4/2010 |
| JP | 2010-209982 A | 9/2010 |

*Primary Examiner* — David J Hlavka
(74) *Attorney, Agent, or Firm* — Foley & Lardner LLP (57) ABSTRACT

The present invention relates to a control device and a control method for a vehicle in which a lockup clutch is disengaged when a rotation speed of an engine falls below a disengagement rotation speed. The device/method changes a speed ratio of a variator on the basis of a shifting map in which a primary pulley rotation speed on a coast line is set higher than a primary pulley rotation speed on a drive line and sets a target input rotation speed of the variator to a predetermined target input rotation speed higher than the primary pulley rotation speed on the drive line when an operation of an accelerator pedal is performed such that an accelerator pedal opening falls to a first predetermined opening or less. As a result, the present invention can suppress drop of fuel efficiency of the engine caused by disengagement of the lockup clutch which is a friction engagement element.

14 Claims, 10 Drawing Sheets

(51) Int. Cl.
*F16H 59/42* (2006.01)
*F16H 61/02* (2006.01)
F16H 59/22 (2006.01)
F16H 59/36 (2006.01)

(52) U.S. Cl.
CPC ..... *F16H 61/0204* (2013.01); *F16H 61/0213* (2013.01); *F16H 61/66259* (2013.01); *F16H 59/22* (2013.01); *F16H 2059/366* (2013.01); *F16H 2061/0234* (2013.01)

(58) Field of Classification Search
CPC .... F16H 59/42; F16H 2059/366; F16H 59/22; F16H 2061/0234
See application file for complete search history.

(56) References Cited

U.S. PATENT DOCUMENTS

| | | | |
|---|---|---|---|
| 2013/0165296 A1* | 6/2013 | Kabe | F16H 61/6648 |
| | | | 477/37 |
| 2017/0108117 A1* | 4/2017 | Natsume | F16H 59/44 |
| 2017/0299051 A1* | 10/2017 | Sawada | F16H 61/0204 |
| 2018/0080550 A1* | 3/2018 | Iwasa | F16H 59/42 |
| 2018/0180178 A1* | 6/2018 | Inoue | F16H 61/662 |

\* cited by examiner

VEHICLE CONTROL DEVICE AND VEHICLE CONTROL METHOD

TECHNICAL FIELD

The present invention relates to a vehicle control device and a vehicle control method.

BACKGROUND ART

A control device for shifting a speed of a continuously variable transmission on the basis of a shifting map set such that a target input rotation speed (first target input rotation speed) on a shifting line when an accelerator pedal opening is larger than zero is set lower than a target input rotation speed (second target input rotation speed) on a coast line when the accelerator pedal opening is zero is disclosed in JP2010-209982A,

SUMMARY OF INVENTION

In a vehicle, a torque converter having a lockup clutch is disposed in general between a driving source and a continuously variable transmission, and fuel-cut for stopping fuel injection to the engine is performed in a state where rotation is transmitted from a driving wheel to a rotating shaft of the engine by engaging the lockup clutch during deceleration. As a result, fuel efficiency in the engine can be improved.

However, when the transmission is controlled by using the shifting map in the aforementioned technology, a rotation speed of the engine lowers during the deceleration, the lockup clutch is disengaged, and fuel-cut recover for performing fuel injection to the engine is executed in some cases in the following scene, for example.

When the lockup clutch is engaged and the vehicle is decelerated, a disengagement rotation speed for disengaging the lockup clutch is set so that the engine rotation speed does not lower with a vehicle speed and the engine is not stalled. This disengagement rotation speed is set to a value slightly lower than the first target input rotation speed.

When the accelerator pedal is returned for deceleration so that the accelerator pedal opening becomes zero, after the rotation speed lowers to the first target input rotation speed, when the accelerator pedal opening reaches zero, the rotation speed rises to the second target input rotation speed. As a result, a speed ratio of the continuously variable transmission is changed to a speed ratio corresponding to the first target input rotation speed and then, is changed to a speed ratio corresponding to the second target input rotation speed.

However, when the rotation speed is changed to the speed ratio corresponding to the first target input rotation speed, an actual input rotation speed falls below the first target input rotation speed and the actual input rotation speed falls below than the disengagement rotation speed in some cases due to a response delay by a time constant, an operation delay or the like.

In such a case, the lockup clutch is disengaged, and the fuel-cut recover is executed. Thus, there is a concern that fuel efficiency in the engine becomes lower than a case where the actual input rotation speed does not fall below the disengagement rotation speed and the fuel-cut is continued.

The present invention was made in order to solve such problem and has an object to suppress drop of fuel efficiency in the engine by suppressing disengagement of the lockup clutch, for example, when the vehicle is decelerating.

According to an aspect of the present invention, a vehicle control device adapted to control a vehicle including a continuously variable transmission provided between an engine and a driving wheel and a friction engagement element disposed in series with the continuously variable transmission and disengaged when a rotation speed of the engine falls below a disengagement rotation speed, is provided. The control device includes control means adapted to control a speed ratio of the continuously variable transmission on the basis of a shifting map in which a first target input rotation speed of the continuously variable transmission set when an accelerator pedal opening is zero is set higher than a second target input rotation speed of the continuously variable transmission set when the accelerator pedal opening is a predetermined opening larger than zero. The control means sets a target input rotation speed of the continuously variable transmission to a third target input rotation speed higher than the second target input rotation speed when an accelerator pedal operation is performed such that the accelerator pedal opening falls to the predetermined opening or less.

According to another aspect of the present invention, a vehicle control method for controlling a transmission including a continuously variable transmission provided between an engine and a driving wheel and a friction engagement element disposed in series with the continuously variable transmission and disengaged when a rotation speed of the engine falls below a disengagement rotation speed, is provided. The control method includes controlling a speed ratio of the continuously variable transmission on the basis of a shifting map in which a first target input rotation speed of the continuously variable transmission set when an accelerator pedal opening is zero is set higher than a second target input rotation speed of the continuously variable transmission set when the accelerator pedal opening is a predetermined opening larger than zero; and setting a target input rotation speed of the continuously variable transmission to a third target input rotation speed higher than the second target input rotation speed when an accelerator pedal operation is performed such that the accelerator pedal opening falls to the predetermined opening or less.

According to these aspects, when the accelerator pedal operation is performed so that the accelerator pedal opening falls to the predetermined opening or less, since the target input rotation speed of the continuously variable transmission is set to the third target input rotation speed higher than the second target input rotation speed, falling of the engine rotation speed below the disengagement rotation speed is suppressed, and disengagement of the friction engagement element can be suppressed. As a result, the drop of the fuel efficiency in the engine caused by disengagement of the friction engagement element can be suppressed.

DESCRIPTION OF EMBODIMENTS

Embodiments of the present invention will be explained below by referring to the attached drawings. In the following explanation, a "speed ratio (gear position)" of a transmission mechanism is a value obtained by dividing an input rotation speed of the transmission mechanism by an output rotation speed of the transmission mechanism, and if the speed ratio (gear ratio) is large, it is called "Low", while if it is small, it is called "High". Moreover, when the speed ratio (gear ratio) is shifted to the Low side, it is called down-shift, while when it is shifted to the High side, it is called up-shift.

Figure 1:
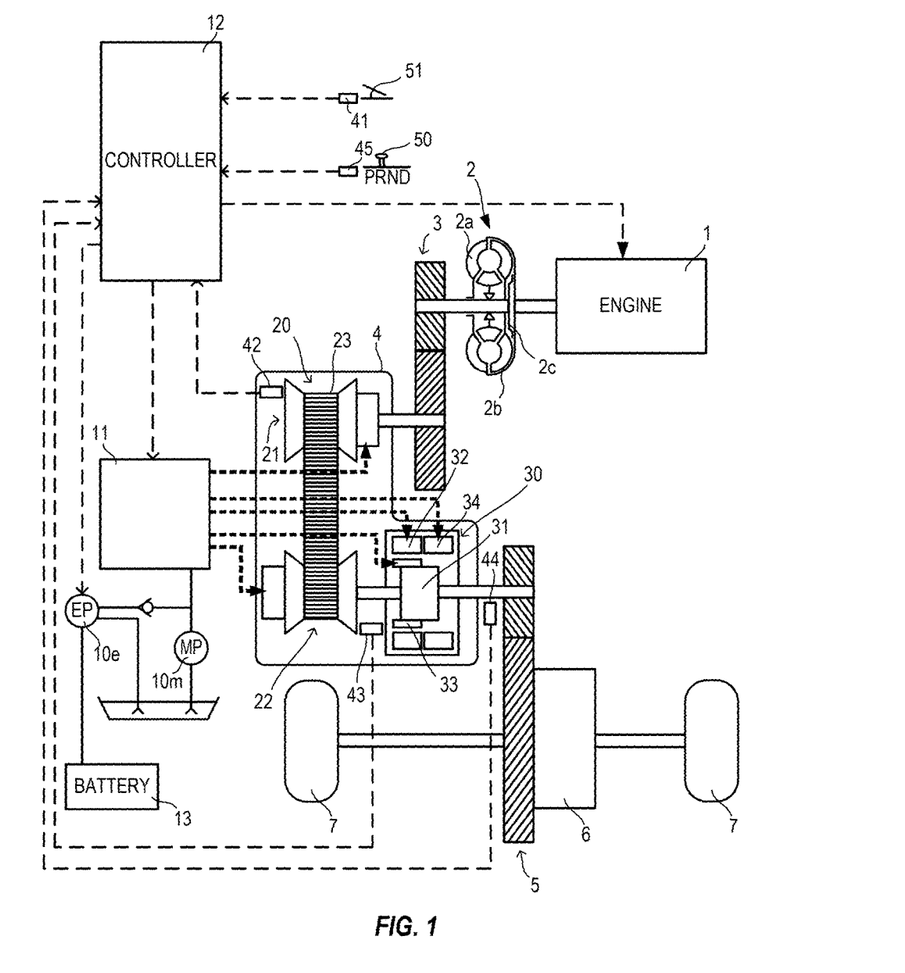
FIG. 1 is a schematic configuration diagram of a vehicle in a first embodiment.

FIG. 1 is a schematic configuration diagram of a vehicle according to an embodiment of the present invention. This vehicle includes an engine 1 as a driving source, and an output rotation of the engine 1 is input into a pump impeller 2a of a torque converter 2 with a lockup clutch 2c and is transmitted to driving wheels 7 through a first gear train 3, a transmission 4, a second gear train 5, and an operating device 6 from a turbine runner 2b.

In the transmission 4, a mechanical oil pump 10m to which rotation of the engine 1 is input and driven by using a part of power of the engine 1 and an electric oil pump 10e driven by receiving power supply from the battery 13 are provided. Moreover, in the transmission 4, a hydraulic control circuit 11 for regulating a hydraulic pressure generated by oil discharged from the mechanical oil pump 10m or the electric oil pump 10e and supplying it to each portion in the transmission 4 is provided.

The transmission 4 includes a belt continuously variable transmission mechanism (hereinafter, referred to as a "variator 20") as a friction transmission mechanism and a sub-transmission mechanism 30 provided in series with the variator 20. The term "provided in series" means that, in a power transmission path from the engine 1 to the driving wheels 7, the variator 20 and the sub-transmission mechanism 30 are provided in series. The sub-transmission mechanism 30 may be directly connected to an output shaft of the variator 20 in this example or may be connected through another transmission or power transmission mechanism (a gear train, for example).

The variator 20 includes a primary pulley 21, a secondary pulley 22, and a V-belt extended between each of the pulleys 21 and 22. In the variator 20, a width of a V-groove is changed in accordance with a primary pulley pressure and a secondary pulley pressure, a contact radius between the V-belt 23 and each of the pulleys 21 and 22 is changed, and an actual speed ratio of the variator 20 is changed continuously variably.

The sub-transmission mechanism 30 is a transmission mechanism having two forward stages and one reverse stage. The sub-transmission mechanism 30 is connected to a Ravigneau-type planetary gear mechanism 31 connecting carriers of two planetary gears and a plurality of friction engagement elements (a Low brake 32, a High clutch 33, a Rev brake 34) connected to a plurality of rotation elements constituting the Ravigneau-type planetary gear mechanism 31 and changing their linked states. When a supply hydraulic pressure to each of the friction engagement elements 32 to 34 is adjusted, and an engagement/disengagement state of each of the friction engagement elements 32 to 34 is changed, a gear position of the sub-transmission mechanism 30 is changed.

When the Low brake 32 is engaged, and the High clutch 33 and the Rev brake 34 are disengaged, the gear position of the sub-transmission mechanism 30 becomes a first speed. When the High clutch 33 is engaged, and the Low brake 32 and the Rev brake 34 are disengaged, the gear position of the sub-transmission mechanism 30 becomes a second speed. When the Rev brake 34 is engaged, and the Low brake 32 and the High clutch 33 are disengaged, the gear position of the sub-transmission mechanism becomes a reverse stage.

By changing an actual speed ratio of the variator 20 and a gear position of the sub-transmission mechanism 30, a speed ratio i of the entire transmission 4 is changed.

Figure 2:
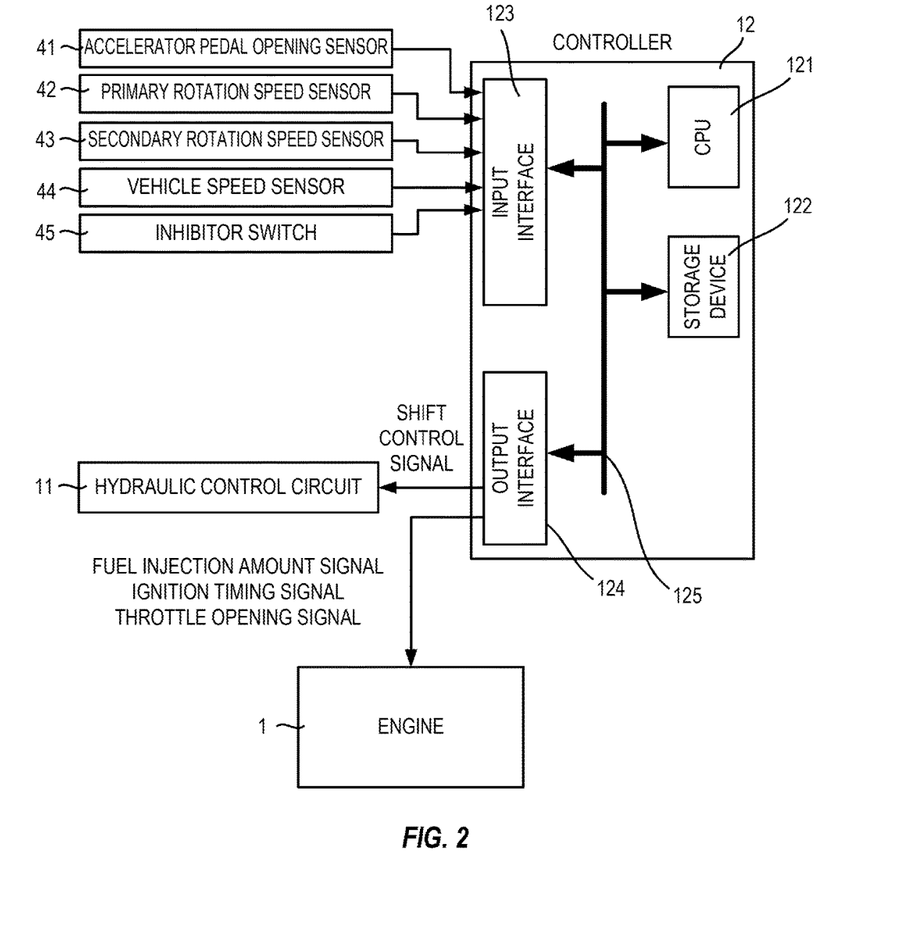
FIG. 2 is a schematic configuration diagram of a controller in the first embodiment.

A controller 12 is a controller 12 for integrally controlling the engine 1 and the transmission 4, and as illustrated in FIG. 2, it includes a CPU 121, a storage device 122 made of RAM/ROM, an input interface 123, an output interface 124, and a bus 125 connecting them to each other.

Into the input interface 123, an output signal of an accelerator pedal opening sensor 41 for detecting an accelerator pedal opening APO which is an operation amount of an accelerator pedal 51, an output signal of a primary rotation speed sensor 42 for detecting a primary pulley rotation speed Npri, an output signal of a secondary rotation speed sensor 43 for detecting a secondary pulley rotation speed Nsec, an output signal of a vehicle speed sensor 44 for detecting a vehicle speed VSP, an output signal of an inhibitor switch 45 for detecting a position of a shift lever 50 and the like are input.

In the storage device 122, a control program of the engine 1, a shift control of the transmission 4, and various maps/tables used in these programs are stored. The CPU 121 reads out and executes the programs stored in the storage device 122, applies various types of calculation processing to the various signals input through the input interface 123, generates a fuel injection amount signal, an ignition timing signal, a throttle opening signal, and a shift control signal and outputs the generated signals to the engine 1 and the hydraulic control circuit 11 through the output interface 124. Various values used by the CPU 121 in calculation processing and their calculation results are stored in the storage device 122 as appropriate.

The hydraulic control circuit 11 includes a plurality of channels and a plurality of hydraulic control valves. The hydraulic control circuit 11 switches a supply path of the hydraulic pressure by controlling a plurality of hydraulic control valves on the basis of the shift control signal from the controller 12, prepares a required hydraulic pressure from the hydraulic pressure generated by oil discharged from the mechanical oil pump 10m or the electric oil pump 10e and supplies it to each portion in the transmission 4. As a result, an actual speed ratio of the variator 20 and a gear position of the sub-transmission mechanism 30 are changed, and the transmission 4 is shifted.

Figure 3:
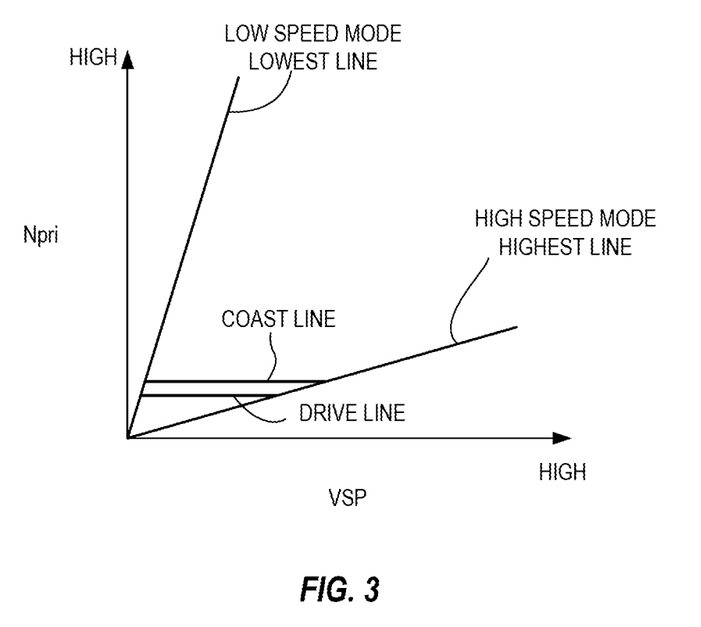
FIG. 3 is a shifting map of the first embodiment.

The shifting of the transmission 4 is performed on the basis of the shifting map illustrated in FIG. 3. In the shifting map, an operation point of the transmission 4 is defined by the vehicle speed VSP and the primary pulley rotation speed Npri. Inclination of a line connecting the operation point of the transmission 4 and a zero point at a lower left corner of the shifting map corresponds to the speed ratio i of the transmission 4 (an entire speed ratio obtained by multiplying a speed ratio of the variator 20 by the speed ratio of the sub-transmission mechanism 30). In the shifting map, a shifting line is set for each accelerator pedal opening APO, and shifting of the transmission 4 is performed in compliance with the shifting line selected in accordance with the accelerator pedal opening APO. The transmission 4 can change the speed ratio between a low-speed mode Lowest line where the sub-transmission mechanism 30 is at the first gear position and the speed ratio of the variator 20 is at Lowest and a high-speed mode Highest line where the sub-transmission mechanism 30 is at the second gear position and the speed ratio of the variator 20 is Highest. In the transmission 4, when the sub-transmission mechanism 30 is changed from the first gear position to the second gear position or from the second gear position to the first gear position, cooperative shifting in which the speed ratio of the variator 20 is shifted in the opposite direction is performed.

In FIG. 3, for simplification, only a low-speed mode Lowest line, a high-speed mode Highest line, a coast line, and a drive line are illustrated. The coast line is a shifting line when the accelerator pedal opening APO is zero (APO=0/8). The drive line is a shifting line when the accelerator pedal opening APO is first predetermined opening APOp1 (APO=0.5/8) which is slightly larger than zero. The coast line and the drive line match the low-speed mode Lowest line in a low vehicle-speed region and match the high-speed mode Highest line in a high vehicle-speed region.

In this embodiment, in order to prevent stall of the engine 1 when the accelerator pedal opening APO is zero and to improve fuel efficiency of the engine 1 when the accelerator pedal opening APO is at the first predetermined opening APOp1, the primary pulley rotation speed NPri on the coast line is made higher than the primary pulley rotation speed Npri on the drive line.

Figure 4:
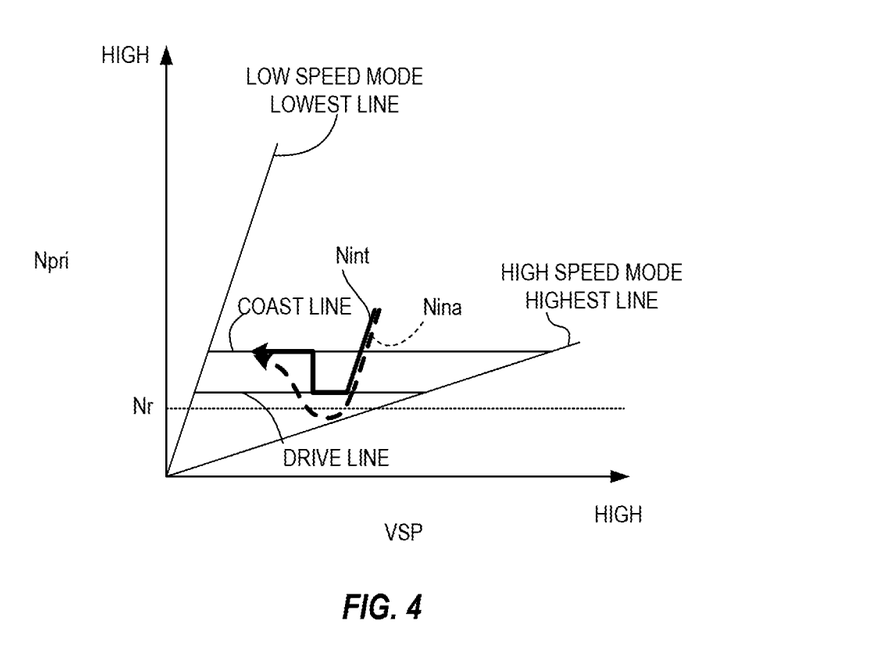
FIG. 4 is a view illustrating a change in an input rotation speed when this embodiment is not used.

In the vehicle in which the coast line and the drive line are set as described above, when stepping on the accelerator pedal 51 ends, and the operation point of the transmission 4 is changed to the coast line via the drive line, usually, a target input rotation speed Nint of the primary pulley 21 is set to a value on the drive line (second target input rotation speed) as indicated by a solid line in FIG. 4 and then, set to a value (first target input rotation speed) on the coast line.

In the variator 20, the hydraulic pressure to be supplied to the primary pulley 21 and the secondary pulley 22 is controlled so as that an actual input rotation speed Nina of the primary pulley 21 follows the target input rotation speed Nint, and the speed ratio is changed. However, due to a response delay by a time constant in the hydraulic pressure control or an operation delay, the actual input rotation speed Nina undershoots the target input rotation speed Nint as indicated by a broken line in FIG. 4.

The lockup clutch 2c provided in the torque converter 2 is engaged excluding a condition such as an extremely low vehicle speed in order to improve power transmission efficiency from the engine 1 to the driving wheels 7. When the rotation speed of the engine 1 falls below the disengagement rotation speed, the lockup clutch 2c is disengaged in order to prevent stall of the engine 1. Thus, the coast line and the drive line are set to a higher rotation speed side of the primary pulley rotation speed Npri than a disengagement rotation speed Nr at which the lockup clutch 2c is disengaged as illustrated in FIG. 4 so that the lockup clutch 2c is not disengaged until vehicle speed VSP reaches the extremely low vehicle speed. In FIG. 4, considering a gear ratio of the first gear train 3, the disengagement rotation speed Nr is expressed in conversion to a rotation speed input into the primary pulley 21. Therefore, when the primary pulley rotation speed Npri falls below the disengagement rotation speed Nr illustrated in FIG. 4, the rotation speed of the engine 1 falls below the disengagement rotation speed, and the lockup clutch 2c is disengaged. In the following, the disengagement rotation speed Nr is compared with the actual input rotation speed Nina in the same manner.

When the undershoot occurs as described above, and the actual input rotation speed Nina falls below the disengagement rotation speed Nr, the lockup clutch 2c is disengaged. As a result, the power transmission rate from the engine 1 to the driving wheels 7 lowers, and fuel efficiency of the engine 1 becomes lower than that in a case where the lockup clutch 2c is engaged.

Moreover, in this embodiment, when stepping on the accelerator pedal 51 ends during running, fuel-cut control for stopping fuel injection to the engine 1 is executed in the state where the lockup clutch 2c is engaged. In such vehicle, if the vehicle speed VSP lowers and the actual input rotation speed Nina falls below the disengagement rotation speed Nr during execution of the fuel-cut control, the lockup clutch 2c is disengaged, the fuel-cut control is stopped, and fuel injection to the engine 1 is resumed. As a result, the fuel injection to the engine 1 can be resumed without stall of the engine 1 not using a starter motor or the like.

However, when stepping on the accelerator pedal 51 ends, and the operation point of the transmission 4 becomes the coast line via the drive line, if the actual input rotation speed Nina falls below the disengagement rotation speed Nr due to the undershoot, the lockup clutch 2c is disengaged, and fuel-cut control is stopped, or the fuel-cut control is not executed.

Thus, when the undershoot occurs as described above and the actual input rotation speed Nina falls below the disengagement rotation speed Nr, fuel efficiency of the engine 1 lowers as compared with the case where the actual input rotation speed Nina does not fall below the disengagement rotation speed Nr.

Figure 5:
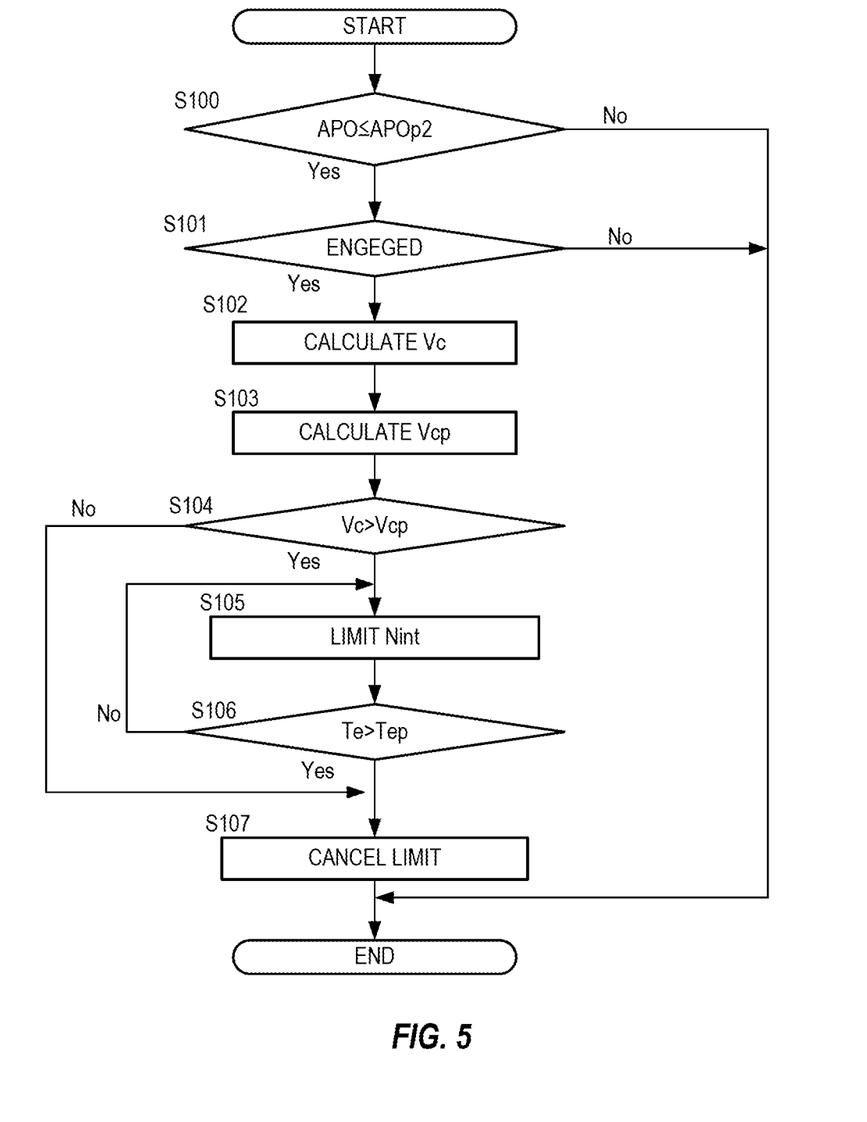
FIG. 5 is a flowchart illustrating rotation speed limit control in the first embodiment.

Thus, in this embodiment, the following rotation speed limit control is executed. FIG. 5 is a flowchart for explaining the rotation speed limit control in this embodiment.

At Step S100, the controller 12 determines whether the accelerator pedal opening APO is less than or equal to the second predetermined opening APOp2 or not. The second predetermined opening APOp2 is an opening slightly larger than the first predetermined opening APOp1 which is the drive line and is set in advance. When the accelerator pedal opening APO is less than or equal to the second predetermined opening APOp2, the processing proceeds to Step S101, while when the accelerator pedal opening APO is larger than the second predetermined opening APOp2, the processing this time is finished.

At Step S101, the controller 12 determines whether the lockup clutch 2c is engaged or not. When the lockup clutch 2c is engaged, the processing proceeds to Step S102, while when the lockup clutch 2c is disengaged, the processing this time is finished.

At Step S102, the controller 12 calculates a closing speed Vc which is a returning operation speed of the accelerator pedal opening APO. The controller 12 calculates the closing speed Vc of the accelerator pedal opening APO from the current accelerator pedal opening APO and the accelerator pedal opening APO at the previous processing.

At Step S103, the controller 12 calculates a predetermined closing speed Vcp. Specifically, the controller 12 calculates the predetermined closing speed Vcp by dividing the current accelerator pedal opening APO by predetermined time Tp. The predetermined time Tp is delay time until a change in the actual input rotation speed Nina appears with respect to a change in the target input rotation speed Nint and is set in advance from the response delay by the time constant in the hydraulic pressure control or the operation delay.

At Step S104, the controller 12 determines whether the closing speed Vc of the accelerator pedal opening APO is larger than the predetermined closing speed Vcp or not.

Here, the accelerator pedal opening APO is smaller than the second predetermined opening APOp2, and when the closing speed Vc of the accelerator pedal opening APO is larger than the predetermined closing speed Vcp, the controller 12 determines that the accelerator pedal opening APO falls to the first predetermined opening APOp1 or less, and the accelerator pedal opening APO becomes zero in the predetermined time Tp.

Moreover, when the accelerator pedal opening APO becomes zero, and the target input rotation speed Nint is set to a value on the coast line via the drive line, the controller 12 determines that the actual input rotation speed Nina undershoots the target input rotation speed Nint, and the actual input rotation speed Nina falls below the disengagement rotation speed Nr.

That is, when the closing speed Vc of the accelerator pedal opening APO is larger than the predetermined closing speed Vcp, the controller 12 determines that, if the target input rotation speed Nint is set in accordance with the accelerator pedal opening APO, the actual input rotation speed Nina falls below the disengagement rotation speed Nr due to the undershoot. When the actual input rotation speed Nina falls below the disengagement rotation speed Nr due to the undershoot, the processing proceeds to Step S105, while when the actual input rotation speed Nina does not fall below the disengagement rotation speed Nr due to the undershoot, the processing proceeds to Step S107.

At Step S105, the controller 12 limits the target input rotation speed Nint. Specifically, the controller 12 sets the target input rotation speed Nint to a predetermined target input rotation speed Nintp (third target input rotation speed). The predetermined target input rotation speed Nintp is a value obtained by adding deviation between the primary pulley rotation speed Npri on the drive line and the disengagement rotation speed Nr to the primary pulley rotation speed Npri on the drive line. The predetermined target input rotation speed Nintp is higher than the primary pulley rotation speed Npri on the drive line and lower than the primary pulley rotation speed Npri on the coast line.

Figure 6:
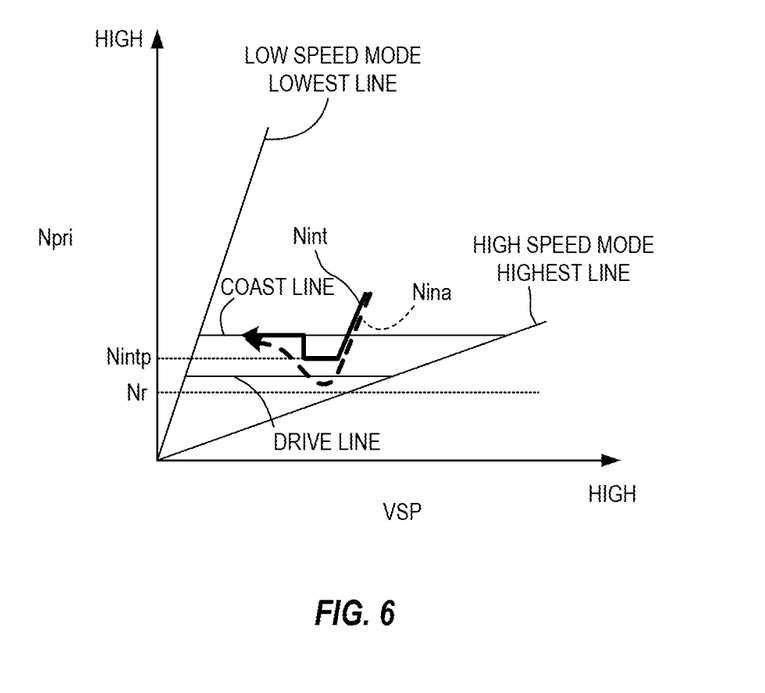
FIG. 6 is a view illustrating a change in the input rotation speed when the first embodiment is used.

As a result, when the stepping on the accelerator pedal 51 ends, and even if the operation point of the transmission 4 should have been changed to the coast line via the drive line, the target input rotation speed Nint does not fall to a value on the drive line but becomes the predetermined target input rotation speed Nintp, and the actual input rotation speed Nina changes by following the predetermined target input rotation speed Nintp. Therefore, the actual input rotation speed Nina becomes higher than the case where the target input rotation speed Nint is set on a value on the drive line, and the actual input rotation speed Nina does not fall below the disengagement rotation speed Nr as illustrated in FIG. 6.

As described above, since the target input rotation speed Nint is set to the predetermined target input rotation speed Nintp, the speed ratio i of the transmission 4 is changed on the basis of the predetermined target input rotation speed Nintp and the vehicle speed VSP.

At Step S106, the controller 12 determines whether a predetermined end condition is satisfied or not. Specifically, the controller 12 determines whether elapsed time Te since the target input rotation speed Nint is set to the predetermined target input rotation speed Nintp has reached predetermined elapsed time Tep or not. The predetermined elapsed time Tep is maximum time until the actual input rotation speed Nina which undershot is switched from falling to increasing and is set in advance. The undershoot amount changes in accordance with the returning operation of the accelerator pedal 51. Here, the predetermined elapsed time Tep is set to the maximum time with respect to the returning operation of the accelerator pedal 51, that is, the undershoot amount so as to prevent the actual input rotation speed Nina from falling below the disengagement rotation speed Nr. Until the elapsed time Te reaches the predetermined elapsed time Tep, the processing returns to Step S105, and when the elapsed time Te reaches the predetermined time Tep, the processing proceeds to Step S107.

At Step S107, the controller 12 cancels the limit on the target input rotation speed Nint. As a result, the speed ratio i of the transmission 4 is changed in accordance with the shifting line according to the accelerator pedal opening APO. For example, if the accelerator pedal opening APO is zero, the target input rotation speed Nint is set to a value on the coast line, and the speed ratio i of the transmission 4 is changed. Moreover, if the accelerator pedal opening APO is the first predetermined opening APOp1, the target input rotation speed Nint is set on the value on the drive line, and the speed ratio i of the transmission 4 is changed.

Figure 7:
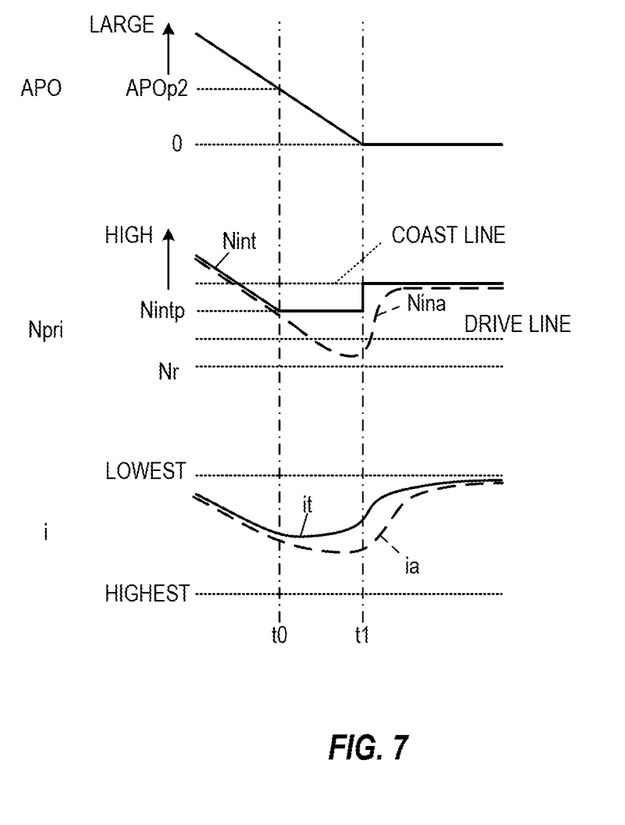
FIG. 7 is a time chart illustrating the rotation speed limit control in the first embodiment.

Subsequently, the rotation speed limit control of this embodiment will be described by using a time chart in FIG. 7.

At time t0, it is determined that the accelerator pedal opening APO falls below the second predetermined opening APOp2, and the closing speed Vc of the accelerator pedal opening APO is larger than the predetermined closing speed Vcp. As a result, the target input rotation speed Nint is limited and is set to the predetermined target input rotation speed Nintp. Here, the target input rotation speed Nint is set to a value higher than the primary pulley rotation speed Npri on the drive line by a deviation portion between the primary pulley rotation speed Npri on the drive line and the disengagement rotation speed Nr. In such a case, too, the actual input rotation speed Nina undershoots the target input rotation speed Nint, but the actual input rotation speed Nina does not fall below the disengagement rotation speed Nr. The actual speed ratio is corresponding to the actual input rotation speed Nina goes to the Higher side than the target speed ratio it corresponding to the target input rotation speed Nint by the undershoot.

At time t1 after the predetermined elapsed time Tep has elapsed since the target input rotation speed Nint is limited to the predetermined target input rotation speed Nintp, the limit on the target input rotation speed Nint is cancelled. As a result, the target input rotation speed Nint is changed to a value on the coast line according to the accelerator pedal opening APO. Moreover, the target speed ratio it and the actual speed ratio is are changed to the Low side.

Effects of the first embodiment of the present invention will be explained.

In the transmission 4 in which the coast line is provided to the higher rotation speed side of the primary pulley rotation speed Npri than the drive line, when the accelerator pedal opening APO falls below the first predetermined opening APOp1, the target input rotation speed Nint of the primary pulley 21 is set to the predetermined target input rotation speed Nintp higher than the value on the drive line. As a result, even if the actual input rotation speed Nina falls below the target input rotation speed Nint, falling of the actual input rotation speed Nina below the disengagement rotation speed Nr at which the lockup clutch 2c is disengaged can be suppressed. Thus, drop in the fuel efficiency of the engine 1 caused by disengagement of the lockup clutch 2c can be suppressed. Moreover, non-execution of the fuel-cut control or early execution of the fuel-cut recover is suppressed, and drop in the fuel efficiency of the engine 1 can be suppressed.

If the actual input rotation speed Nina falls below the disengagement rotation speed Nr due to the undershoot of the actual input rotation speed Nina by the returning operation of the accelerator pedal 51, the target input rotation speed Nint is set to the predetermined target input rotation speed Nintp. As a result, falling of the actual input rotation speed Nina below the disengagement rotation speed Nr due to the undershoot can be suppressed, and drop in the fuel efficiency of the engine 1 can be suppressed.

Moreover, if the actual input rotation speed Nina does not fall below the disengagement rotation speed Nr, the target input rotation speed Nint is set in accordance with the returning operation of the accelerator pedal 51, and the speed ratio i of the transmission 4 can be changed in accordance with the target input rotation speed Nint. When the target input rotation speed Nint is limited to the predetermined target input rotation speed Nintp, even though the accelerator pedal opening APO is at zero, for example, since the operation point of the transmission 4 is not on the coast line, there is a concern that a sense of discomfort is given to the driver. In this embodiment, such sense of discomfort can be suppressed from being given to the driver while the drop in the fuel efficiency of the engine 1 is suppressed.

When the closing speed Vc of the accelerator pedal opening APO is larger than the predetermined closing speed Vcp, it is determined that the actual input rotation speed Nina falls below than the disengagement rotation speed Nr by the undershoot. As a result, even if the rotation speed cannot be detected by the primary rotation speed sensor 42, it can be determined whether the actual input rotation speed Nina falls below than the disengagement rotation speed Nr by the undershoot or not.

The predetermined target input rotation speed Nintp is set by adding a difference between the primary pulley rotation speed Npri on the drive line and the disengagement rotation speed Nr to the primary pulley rotation speed Npri on the drive line. As a result, an excessive increase in the predetermined target input rotation speed Nintp can be prevented. After the target input rotation speed Nint is set to predetermined target input rotation speed Nintp, when the rotation speed limit control is finished in a state where the operation point of the transmission 4 based on the accelerator pedal opening APO is on the drive line, the target input rotation speed Nint is changed to a value on the drive line. At this time, when the predetermined target input rotation speed Nintp is high, a change amount of the actual input rotation speed Nina, that is, a change amount (upshift amount) of the speed ratio i of the transmission 4 increases. In such a case, since the driver is not operating the accelerator pedal 51, if the change amount of the speed ratio i of the transmission 4 increases, there is a concern that a sense of discomfort is given to the driver. In this embodiment, such sense of discomfort given to the driver can be suppressed by preventing the predetermined target input rotation speed Nintp from increasing excessively.

The predetermined target input rotation speed Nintp is made higher than the primary pulley rotation speed Npri on the drive line and lower than the primary pulley rotation speed Npri on the coast line. As a result, when the rotation speed limit control is finished and the operation point of the transmission 4 is changed to the drive line or to the coast line, the change amount of the speed ratio i of the transmission 4 can be made smaller, whereby the sense of discomfort given to the driver can be suppressed.

When the predetermined end condition is satisfied, the rotation speed limit control is finished, and the target input rotation speed Nint is set to a value according to the accelerator pedal opening APO. As a result, a state where the operation point of the transmission 4 based on the accelerator pedal opening APO does not match the actual operation point of the transmission 4 can be shortened, and giving of the sense of discomfort to the driver can be suppressed.

When the elapsed time Te after the target input rotation speed Nint is set to the predetermined input rotation speed reaches the predetermined elapsed time Tep, it is determined that the predetermined end condition is satisfied. The predetermined elapsed time Tep is the maximum time until the actual input rotation speed Nina which undershot is switched from the drop to the increase after the target input rotation speed Nint is set to the predetermined target input rotation speed Nintp. The undershoot amount is different depending on the returning operation of the accelerator pedal opening APO. In this embodiment, by setting the predetermined end condition as above, falling of the actual input rotation speed Nina below the disengagement rotation speed Nr can be prevented regardless of the returning operation of the accelerator pedal opening APO.

Subsequently, a variation of the first embodiment will be explained. In the variation, a setting method of the predetermined target input rotation speed Nintp at Step S105 is different.

The predetermined target input rotation speed Nintp at Step S105 in the variation is set to a value obtained by adding a maximum difference between the disengagement rotation speed Nr and the actual input rotation speed Nina when the actual input rotation speed Nina falls below the disengagement rotation speed Nr due to the undershoot to the primary pulley rotation speed Npri on the drive line. Such maximum difference is calculated in advance by an experiment or the like.

Figure 8:
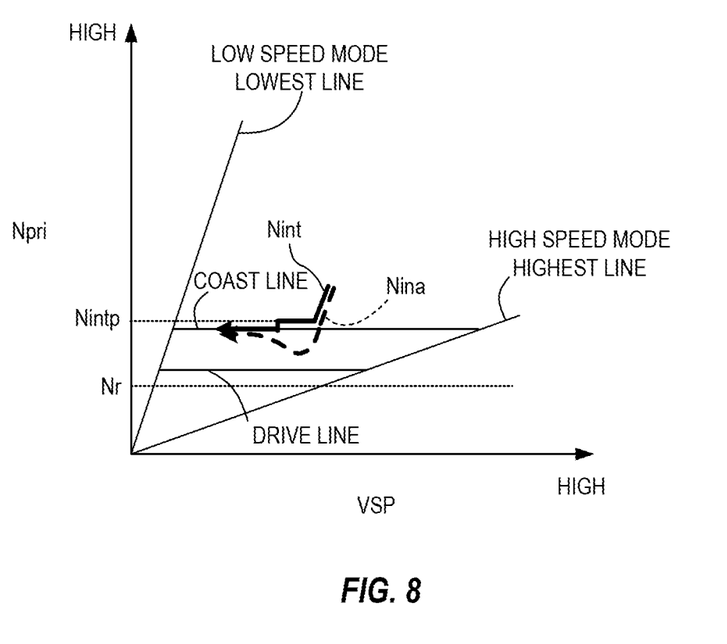
FIG. 8 is a view illustrating a variation of the first embodiment.

As a result, when the target input rotation speed Nint is limited as illustrated in FIG. 8, the actual input rotation speed Nina does not fall below the disengagement rotation speed Nr. Thus, the falling of the actual input rotation speed Nina below the disengagement rotation speed Nr can be prevented, and drop of the fuel efficiency of the engine 1 can be prevented.

Moreover, as another variation, the predetermined target input rotation speed Nintp at Step S105 is set to a value on the coast line.

Figure 9:
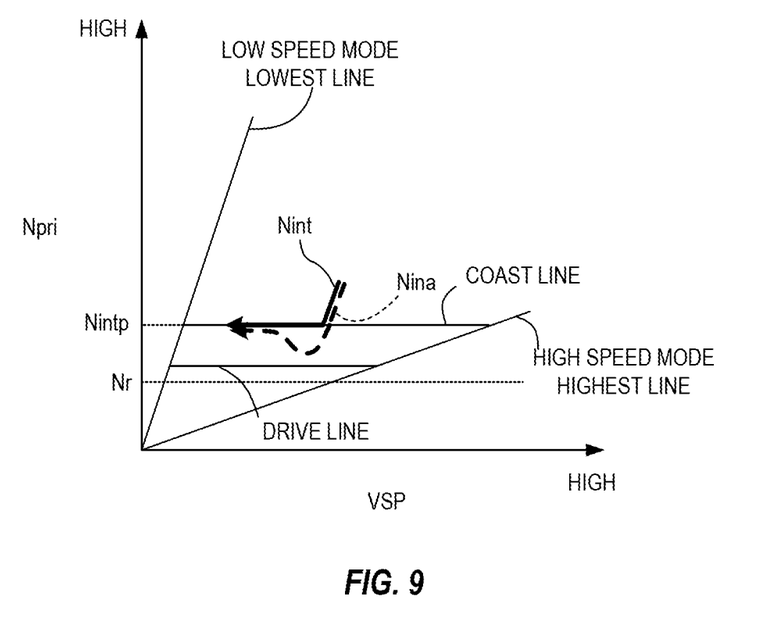
FIG. 9 is a view illustrating a variation of the first embodiment.

As a result, the target input rotation speed Nint is limited as illustrated in FIG. 9, and the actual input rotation speed Nina does not fall below the disengagement rotation speed Nr. In this variation, too, falling of the actual input rotation speed Nina below the disengagement rotation speed Nr can be prevented, and drop of the fuel efficiency of the engine 1 can be prevented. Moreover, if the accelerator pedal opening APO is zero when the rotation speed limit control is finished, the change amount of the actual input rotation speed Nina is small, and the sense of discomfort given to the driver can be suppressed.

Subsequently, a second embodiment of the present invention will be explained.

Figure 10:
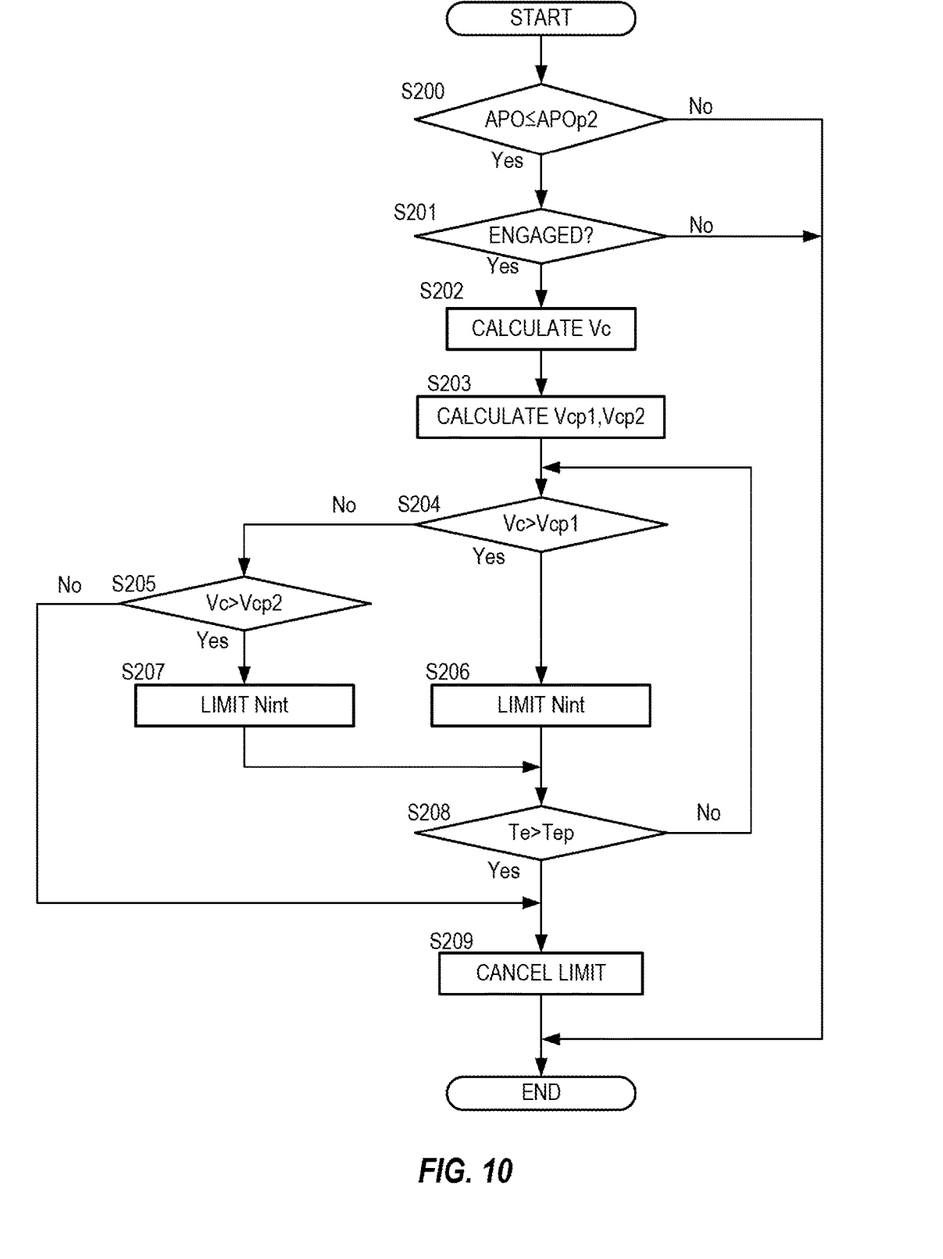
FIG. 10 is a flowchart illustrating rotation speed limit control in a second embodiment.

In the second embodiment, the rotation speed limit control is different, and the rotation speed limit control of the second embodiment will be explained by using a flowchart in FIG. 10.

Since processing from Step S200 to Step S202 is the same as those in the first embodiment, the explanation here is omitted.

At Step S203, the controller 12 calculates a first predetermined closing speed Vcp1 and a second predetermined closing speed Vcp2. The first predetermined closing speed Vcp1 is calculated by dividing the current accelerator pedal opening APO by first predetermined time Tp1. The second predetermined closing speed Vcp2 is calculated by dividing the current accelerator pedal opening APO by second predetermined time Tp2. The first predetermined time Tp1 is delay time until the change of the actual input rotation speed Nina starts with respect to the change in the target input rotation speed Nint and is set in advance from the response delay by the time constant in the hydraulic pressure control, the operation delay and the like. The second predetermined time Tp2 has the delay time set longer than the first predetermined time Tp1, and the first predetermined closing speed Vcp1 is set larger than the second predetermined closing speed Vcp2.

At Step S204, the controller 12 determines whether the closing speed Vc of the accelerator pedal opening APO is larger than the first predetermined closing speed Vcp1 or not. If the closing speed Vc of the accelerator pedal opening APO is larger than the first predetermined closing speed Vcp1, the processing proceeds to Step S206, while if the closing speed Vc of the accelerator pedal opening APO is less than or equal to the first predetermined closing speed Vcp1, the processing proceeds to Step S205.

At Step S205, it is determined whether the closing speed Vc of the accelerator pedal opening APO is larger than the second predetermined closing speed Vcp2. If the closing speed Vc of the accelerator pedal opening APO is larger than the second predetermined closing speed Vcp2, the processing proceeds to Step S207, while if the closing speed Vc of the accelerator pedal opening APO is less than or equal to the first predetermined closing speed Vcp1, the processing proceeds to Step S209.

The undershoot amount of the actual input rotation speed Nina with respect to the target input rotation speed Nint changes in accordance with the closing speed Vc of the accelerator pedal opening APO. Thus, in this embodiment, the following processing is changed in accordance with the closing speed Vc of the accelerator pedal opening APO.

At Step S206, the controller 12 limits the target input rotation speed Nint and sets the target input rotation speed Nint to a first predetermined target input rotation speed Nintp1. The first predetermined target input rotation speed Ninpt1 is a value on the coast line.

At Step S207, the controller 12 limits the target input rotation speed Nint and sets the target input rotation speed Nint to a second predetermined target input rotation speed Nintp2. The second predetermined target input rotation speed Ninpt2 is the same value as the predetermined target input rotation speed Nintp in the first embodiment.

As described above, in this embodiment, if the closing speed Vc of the accelerator pedal opening APO is larger than the first predetermined closing speed Vcp1, the undershoot amount to the primary pulley rotation speed Npri on the drive line is large and thus, at Step S206, the target input rotation speed Nint is limited to the first predetermined target input rotation speed Nintp1 which is a value on the coast line sufficiently higher than the primary pulley rotation speed Npri on the drive line. On the other hand, if the closing speed Vc of the accelerator pedal opening APO is smaller than the first predetermined closing speed Vcp1 but larger than the second predetermined closing speed Vcp2, though the closing speed Vc of the accelerator pedal opening APO is smaller than the first predetermined closing speed Vcp1, the undershoot occurs to the primary pulley rotation speed Npri on the drive line and thus, the target input rotation speed Nint needs to be limited. Therefore, at Step S207, the target input rotation speed Nint is limited to the second predetermined target input rotation speed Nintp2 which is a value obtained by adding the deviation between the primary pulley rotation speed Npri on the drive line and the disengagement rotation speed Nr to the primary pulley rotation speed Npri on the drive line.

At Step S208, the controller 12 determines whether the predetermined end condition is satisfied or not. Specifically, the controller 12 determines whether the elapsed time Te from when the target input rotation speed Nint is set to the first predetermined target input rotation speed Nintp1 or the second predetermined target input rotation speed Nintp2 has reached the predetermined elapsed time Tep or not. While the elapsed time Te has not reached the predetermined elapsed time Tep, the processing returns to Step S204, and when the elapsed time Te has reached the predetermined elapsed time Tep, the processing proceeds to Step S209.

At Step S209, the controller 12 cancels the limit on the target input rotation speed Nint. As a result, the speed ratio i of the transmission 4 is changed in accordance with the shifting line according to the accelerator pedal opening APO.

Effects of the second embodiment of the present invention will be explained.

In accordance with the closing speed Vc of the accelerator pedal opening APO, the target input rotation speed Nint is set to the first predetermined target input rotation speed Nintp1 or the second predetermined target input rotation speed Nintp2. As a result, falling of the actual input rotation speed Nina below the disengagement rotation speed Nr is prevented, and if the closing speed Vc of the accelerator pedal opening APO is small, the change amount of the actual input rotation speed Nina can be made smaller when the rotation speed limit control is finished, and the sense of discomfort given to the driver can be suppressed.

When the closing speed Vc of the accelerator pedal opening APO is large, that is, the closing speed Vc of the accelerator pedal opening APO is larger than the first predetermined closing speed Vcp1, the target input rotation speed Nint is set to the first predetermined target input rotation speed Nintp1 larger than the second predetermined target input rotation speed Nintp2. As a result, when the closing speed Vc of the accelerator pedal opening APO is large, falling of the actual input rotation speed Nina below the disengagement rotation speed Nr can be prevented. On the other hand, if the closing speed Vc of the accelerator pedal opening APO is not so large, that is, the closing speed Vc of the accelerator pedal opening APO is less than or equal to the first predetermined closing speed Vcp1 and the closing speed Vc of the accelerator pedal opening APO is larger than the second predetermined closing speed Vcp2, the target input rotation speed Nint is set to the second predetermined target input rotation speed Nintp2. As a result, when the rotation speed limit control is finished and the operation point of the transmission 4 is set to the drive line, the change amount of the actual input rotation speed Nina can be made smaller, whereby the sense of discomfort given to the driver can be suppressed.

The embodiment of the present invention described above merely describes some application examples of the present invention and not of the nature to limit the technical scope of the present invention to the specific constructions of the above embodiment.

In the second embodiment, the first predetermined target input rotation speed Nintp1 and the second predetermined target input rotation speed Nintp2 are not limited to the aforementioned combination but the first predetermined target input rotation speed Nintp1 may be set to a value obtained by adding the maximum difference between the disengagement rotation speed Nr and the actual input rotation speed Nina when the actual input rotation speed Nina falls below the disengagement rotation speed Nr due to undershoot to the primary pulley rotation speed Npri on the drive line.

Moreover, the target input rotation speed Nint may be a variable according to the closing speed Vc of the accelerator pedal opening APO. As a result, falling of the actual input rotation speed Nina below the disengagement rotation speed Nr can be prevented, and the change amount of the actual input rotation speed Nina can be made smaller when the rotation speed limit control is finished, whereby the sense of discomfort given to the driver can be suppressed.

In the aforementioned embodiment, the vehicle having the torque converter 2 is explained, but in a case of a vehicle not having the torque converter 2, the friction engagement element may disengage the Low brake 32 or the High clutch 33. Moreover, in the case of the vehicle having the forward/reverse switching mechanism, it may disengage a clutch constituting the forward/reverse switching mechanism.

The rotation speed limit control of this embodiment may be executed when the accelerator pedal opening APO does not become zero and the operation point of the transmission 4 is maintained on the drive line.

In the aforementioned embodiment, it is determined whether the target input rotation speed Nint is limited to the predetermined input rotation speed (including the first predetermined input rotation speed and the second predetermined input rotation speed) in accordance with the closing speed Vc of the accelerator pedal opening APO, but determination may be made on the basis of the lowering speed of the target input rotation speed Nint. As a result, in this case too, the determination can be made with simple configuration. Moreover, the determination may be made on the basis of the closing speed Vc and the lowering speed.

In the aforementioned embodiment, the predetermined elapsed time Tep as the predetermined end condition takes a fixed value, but it may be variable. Specifically, the smaller the closing speed Vc of the accelerator pedal opening APO becomes, the shorter the predetermined elapsed time Tep is set. When the closing speed Vc of the accelerator pedal opening APO becomes smaller, the undershot amount becomes smaller. Thus, by configuring such that the smaller the closing speed Vc of the accelerator pedal opening APO is, the shorter the predetermined elapsed time Tep is set, a period of time during which the operation point of the transmission 4 is out of the accelerator pedal opening APO is shortened, whereby the sense of discomfort given to the driver can be suppressed.

The present application claims a priority of Japanese Patent Application No. 2015-104176 filed with the Japan Patent Office on May 22, 2015, all the contents of which are hereby incorporated by reference.

The invention claimed is:

1. A vehicle control device adapted to control a vehicle including a continuously variable transmission provided between an engine and a driving wheel and a friction engagement element disposed in series with the continuously variable transmission and disengaged when a rotation speed of the engine falls below a disengagement rotation speed, comprising:
   a controller programmed to:
   control a speed ratio of the continuously variable transmission on the basis of a shifting map in which a first target input rotation speed of the continuously variable transmission set when an accelerator pedal opening is zero is set higher than a second target input rotation speed of the continuously variable transmission set when the accelerator pedal opening is a predetermined opening larger than zero, and
   set a target input rotation speed of the continuously variable transmission to a third target input rotation speed which is higher than the second target input rotation speed to limit the target input rotation speed when an accelerator pedal operation is performed such that the accelerator pedal opening falls to the predetermined opening or less and an actual input rotation speed of the continuously variable transmission is determined to fall below the disengagement rotation speed which is set to be less than the second input rotation speed.

2. The vehicle control device according to claim 1, wherein
   the controller sets the target input rotation speed of the continuously variable transmission to the third target input rotation speed when the acceleration pedal operation is performed such that the accelerator pedal opening becomes the predetermined opening or less, and the rotation speed of the engine falls below the disengagement rotation speed.

3. The vehicle control device according to claim 2 wherein
   the controller determines that the rotation speed of the engine falls below the disengagement rotation speed when a returning operation speed of the accelerator pedal is larger than a predetermined operation speed.

4. The vehicle control device according to claim 2, wherein
   the controller determines that the rotation speed of the engine falls below the disengagement rotation speed when a lowering speed of the target input rotation speed of the continuously variable transmission is larger than a predetermined lowering speed.

5. The vehicle control device according to claim 1, wherein
   the third target input rotation speed is set by adding a difference between the second target input rotation speed and the disengagement rotation speed to the second target input rotation speed.

6. The vehicle control device according to claim 5, wherein
   the third target input rotation speed is higher than the second target input rotation speed and lower than the first target input rotation speed.

7. The vehicle control device according to claim 1, wherein
   the third target input rotation speed is set by adding a maximum difference between the second target input rotation speed and the actual input rotation speed when the actual input rotation speed of the continuously variable transmission falls below the disengagement rotation speed to the second target input rotation speed.

8. The vehicle control device according to claim 1, wherein the third target input rotation speed is set to the first target input rotation speed.

9. The vehicle control device according to claim 1, wherein
the controller sets the third target input rotation speed in accordance with a returning operation speed of the accelerator pedal or a lowering speed of the target input rotation speed of the continuously variable transmission.

10. The vehicle control device according to claim 9, wherein
the larger the returning operation speed of the accelerator pedal or the lowering speed of the target input rotation speed of the continuously variable transmission is, the higher third target input rotation speed is.

11. The vehicle control device according to claim 1, wherein
when a predetermined end condition is satisfied, the controller sets the target input rotation speed of the continuously variable transmission to an input rotation speed according to the accelerator pedal opening.

12. The vehicle control device according to claim 11, wherein
when predetermined elapsed time has elapsed since the target input rotation speed of the continuously variable transmission is set to the third target input rotation speed, the controller determines that the predetermined end condition is satisfied; and
the predetermined elapsed time is maximum time from when the target input rotation speed of the continuously variable transmission is set to the third target input rotation speed until the actual rotation speed of the continuously variable transmission increases.

13. A vehicle control method for controlling a vehicle including a continuously variable transmission provided between an engine and a driving wheel and a friction engagement element disposed in series with the continuously variable transmission and disengaged when a rotation speed of the engine falls below a disengagement rotation speed, comprising:
controlling a speed ratio of the continuously variable transmission on the basis of a shifting map in which a first target input rotation speed of the continuously variable transmission set when an accelerator pedal opening is zero is set higher than a second target input rotation speed of the continuously variable transmission set when the accelerator pedal opening is a predetermined opening larger than zero; and
setting a target input rotation speed of the continuously variable transmission to a third target input rotation speed which is higher than the second target input rotation speed to limit the target input rotation speed when an accelerator pedal operation is performed such that the accelerator pedal opening falls to the predetermined opening or less and an actual input rotation speed of the continuously variable transmission is determined to fall below the disengagement rotation speed which is set to be less than the second input rotation speed.

14. A vehicle control device adapted to control a vehicle including a continuously variable transmission provided between an engine and a driving wheel and a friction engagement element disposed in series with the continuously variable transmission and disengaged when a rotation speed of the engine falls below a disengagement rotation speed, comprising:
means for controlling a speed ratio of the continuously variable transmission on the basis of a shifting map in which a first target input rotation speed of the continuously variable transmission set when an accelerator pedal opening is zero is set higher than a second target input rotation speed of the continuously variable transmission set when the accelerator pedal opening is a predetermined opening larger than zero, and
means for setting a target input rotation speed of the continuously variable transmission to a third target input rotation speed which is higher than the second target input rotation speed to limit the target input rotation speed when an accelerator pedal operation is performed such that the accelerator pedal opening falls to the predetermined opening or less and an actual input rotation speed of the continuously variable transmission is determined to fall below the disengagement rotation speed which is set to be less than the second input rotation speed.

* * * * *